United States Patent
Baudot et al.

(10) Patent No.: US 11,131,808 B2
(45) Date of Patent: Sep. 28, 2021

(54) WAVE GUIDE

(71) Applicants: STMicroelectronics (Crolles 2) SAS, Crolles (FR); STMicroelectronics (Alps) SAS, Grenoble (FR)

(72) Inventors: Charles Baudot, Lumbin (FR); Sylvain Guerber, Brie et Angonnes (FR); Patrick Le Maitre, Biviers (FR)

(73) Assignees: STMICROELECTRONICS (ALPS) SAS, Grenoble (FR); STMICROELECTRONICS (CROLLES 2) SAS, Crolles (FR)

( * ) Notice: Subject to any disclaimer, the term of this patent is extended or adjusted under 35 U.S.C. 154(b) by 25 days.

(21) Appl. No.: 16/549,843

(22) Filed: Aug. 23, 2019

(65) Prior Publication Data
US 2020/0073051 A1   Mar. 5, 2020

(30) Foreign Application Priority Data
Aug. 31, 2018   (FR) ...................................... 1857847

(51) Int. Cl.
| | |
|---|---|
| *G02B 6/125* | (2006.01) |
| *G02B 6/14* | (2006.01) |
| *G02B 6/122* | (2006.01) |
| *G02B 6/12* | (2006.01) |

(52) U.S. Cl.
CPC ............ *G02B 6/125* (2013.01); *G02B 6/122* (2013.01); *G02B 6/14* (2013.01); *G02B 2006/12097* (2013.01); *G02B 2006/12109* (2013.01); *G02B 2006/12152* (2013.01)

(58) Field of Classification Search
CPC ...................... G02B 6/125; G02B 6/14; G02B 2006/12097; G02B 2006/12109; G02B 2006/12152
See application file for complete search history.

(56) References Cited

U.S. PATENT DOCUMENTS

| | | | |
|---|---|---|---|
| 4,999,686 A | 3/1991 | Autier et al. | |
| 7,006,744 B2* | 2/2006 | Carniel .............. | G02B 6/12007 385/129 |
| 7,221,843 B2* | 5/2007 | Aalto ................... | G02B 6/1228 385/129 |
| 7,315,679 B2* | 1/2008 | Hochberg .............. | B82Y 10/00 385/129 |
| 8,649,639 B2 | 2/2014 | Mekis et al. | |
| 9,354,396 B2* | 5/2016 | Baudot ............... | G02B 6/2813 |
| 9,429,693 B2* | 8/2016 | Takahashi ............ | G02F 1/3501 |
| 9,448,425 B2* | 9/2016 | Ogawa .................. | G02F 1/015 |

(Continued)

FOREIGN PATENT DOCUMENTS

| | | |
|---|---|---|
| CN | 211206839 U | 8/2020 |
| FR | 2633401 A1 | 12/1989 |

(Continued)

*Primary Examiner* — Daniel Petkovsek
(74) *Attorney, Agent, or Firm* — Slater Matsil, LLP

(57) ABSTRACT

In one embodiment, a waveguide includes an upstream portion, a downstream portion, and an intermediate portion between the upstream portion and the downstream portion. A first band is disposed on an insulating layer, the first band oriented along a first direction. A first lateral strip and a second lateral strip are disposed on either side of the first band, the first lateral strip and the second lateral strip being thinner or interrupted along the intermediate portion.

26 Claims, 3 Drawing Sheets

(56) References Cited

U.S. PATENT DOCUMENTS

| | | |
|---|---|---|
| 9,810,840 B2 * | 11/2017 | Shi .................. G02B 6/126 |
| 2004/0131310 A1 | 7/2004 | Walker |
| 2011/0217002 A1 | 9/2011 | Mekis et al. |
| 2015/0063769 A1 | 3/2015 | Doerr et al. |
| 2015/0253471 A1 | 9/2015 | Takahashi |
| 2017/0090118 A1 | 3/2017 | Sodagar et al. |
| 2020/0073051 A1 | 3/2020 | Baudot et al. |

FOREIGN PATENT DOCUMENTS

| | | |
|---|---|---|
| GB | 2367377 A | 4/2002 |
| WO | 0231587 A2 | 4/2002 |

\* cited by examiner

WAVE GUIDE

CROSS-REFERENCE TO RELATED APPLICATIONS

This application claims the priority benefit of French patent application number 18/57847, filed on Aug. 31, 2018, the content of which is hereby incorporated by reference in its entirety.

TECHNICAL FIELD

The present disclosure concerns the field of waveguides, and more particularly waveguides of photonic (optoelectronic and/or optical) integrated circuits.

BACKGROUND

In an integrated photonic circuit, a light signal may be transmitted by means of a waveguide. The dimensions of the waveguide are currently selected so that a given optical mode of the signal, generally the transverse electric (TEo) and/or transverse magnetic (TMo) fundamental mode, is the only guided mode propagating through the waveguide. However, inhomogeneities in the material of the waveguide and/or variations of the geometry of the waveguide may cause the occurrence of spurious optical modes in the waveguide, that is, optical modes of higher order when the only guided mode is the fundamental mode. Such spurious modes are disturbing, particularly due to the fact that destructive interferences may occur between the guided mode and the spurious modes.

SUMMARY

It would be desirable to have a waveguide comprising a spurious mode filtering device, which overcomes at least certain disadvantages of known spurious mode filtering devices.

An embodiment provides a waveguide comprising a spurious mode filtering device, wherein the spurious mode filtering has a relatively limited impact, or even no impact, on the transmission of the guided mode.

Thus, an embodiment provides a waveguide comprising a first band and two lateral strips on either side of the first band, the two strips being thinner or interrupted along an intermediate portion of the band.

According to an embodiment, the intermediate portion is a portion of the length of the first band.

According to an embodiment, each strip is in contact with the first band.

According to an embodiment, for each strip, a second band and the first band are arranged on either side of the strip.

According to an embodiment, each second band runs parallel to the first band.

According to an embodiment, each second band is, along the intermediate portion, at least partially made of a material selected to absorb the wavelengths of a signal intended to be propagated through the waveguide.

According to an embodiment, the material is selected from the group comprising silicide, germanium, silicon carbide, germanium-silicon, tin, titanium, titanium nitride, tantalum, tantalum nitride, tungsten, copper, and alloys or mixtures of these materials.

According to an embodiment, the intermediate portion is interposed between two portions of the first band.

According to an embodiment, along each of the two portions of the first band, the strips are configured so that the effective optical index of a guided optical mode intended to be propagated through the waveguide varies progressively all the way to the intermediate portion.

According to an embodiment, each strip is interrupted along the intermediate portion and, along each of the two portions of the first band, the width of the strip progressively decreases all the way to the intermediate portion.

According to an embodiment, each strip is thinner along the intermediate portion, and, along each of the two portions of the first band, each strip comprises an upper portion having its width decreasing all the way to the intermediate portion.

According to an embodiment, the intermediate portion is curved lengthwise.

According to an embodiment, the band and the strips rest on an insulating layer of a structure of silicon-on insulator type.

Another embodiment provides an integrated photonic circuit comprising at least one waveguide such as defined hereabove.

Another embodiment provides a method of filtering spurious modes of an optical signal propagating through a waveguide such as defined hereabove.

BRIEF DESCRIPTION OF THE DRAWINGS

The foregoing and other features and advantages will be discussed in detail in the following non-limiting description of specific embodiments in connection with the accompanying drawings.

DETAILED DESCRIPTION OF ILLUSTRATIVE EMBODIMENTS

Figure 1:
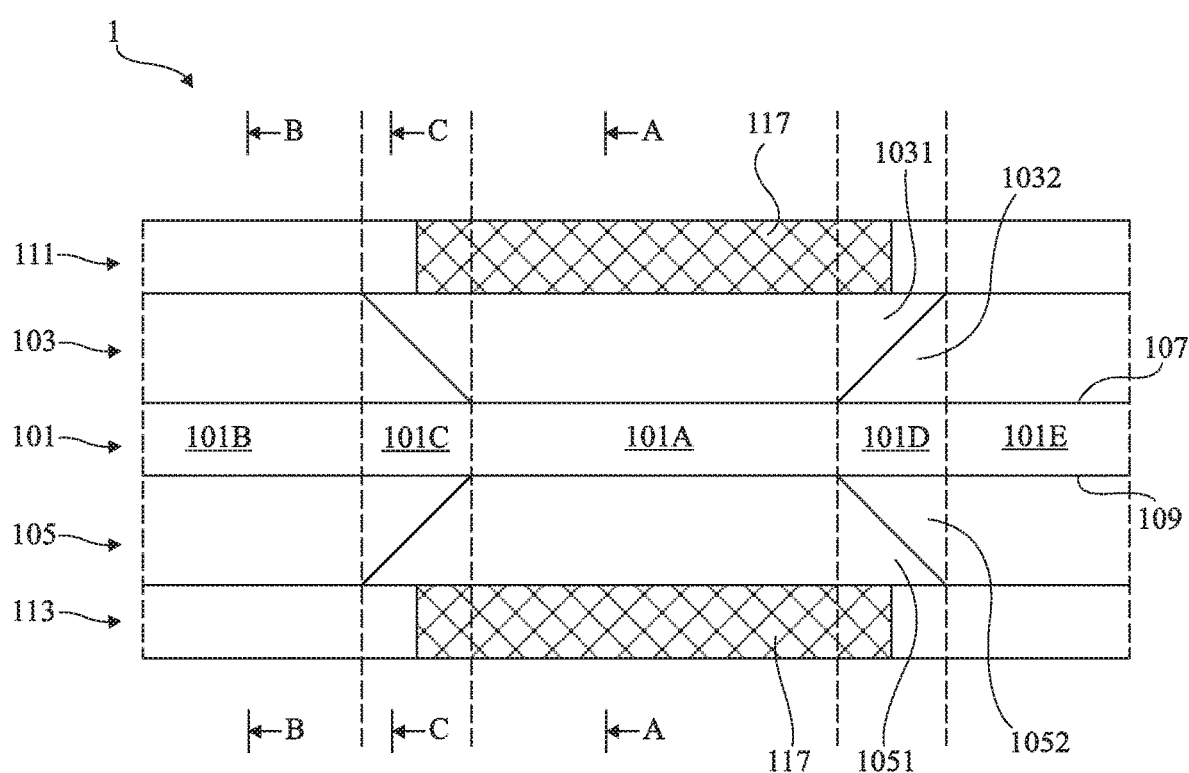
FIG. 1 is a partial simplified top view of an embodiment of a waveguide.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the photonic integrated circuits where waveguides may be provided have not been detailed, the waveguides described hereafter being compatible with usual photonic circuits.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "substantially", and "approximately" are used herein to designate a tolerance of plus or minus 10%, preferably of plus or minus 5%, of the value in question.

In the following description, when reference is made to a transverse cross-section of an element of a waveguide, the transverse cross-section is orthogonal to the longitudinal direction of the waveguide.

In the following description, a waveguide configured to guide a light signal having a wavelength or wavelengths in the near infrared range, for example in the range from 1 to 2 µm, preferably equal to approximately 1.3 µm or approximately 1.55 µm, for example equal to 1.3 µm or 1.55 µm, is considered. The dimensions and the materials of the waveguide indicated hereafter as an example are selected for such wavelengths, it being understood that it is within the abilities of those skilled in the art, in the light of the following description, to adapt the dimensions and materials to other wavelengths.

Figure 2:
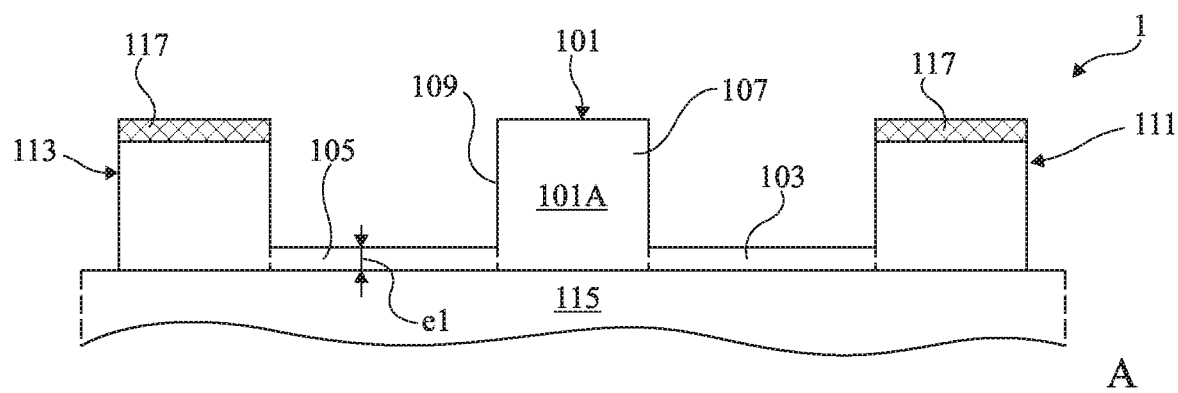
FIG. 2 shows simplified cross-section views A, B, and C of the waveguide of FIG. 1, along respective planes AA, BB, and CC of FIG. 1.
Figure 2:
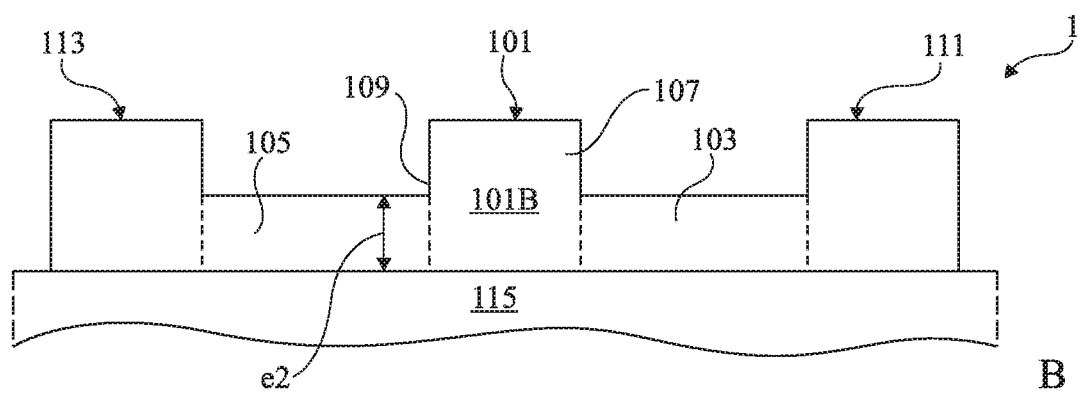
Figure 2:
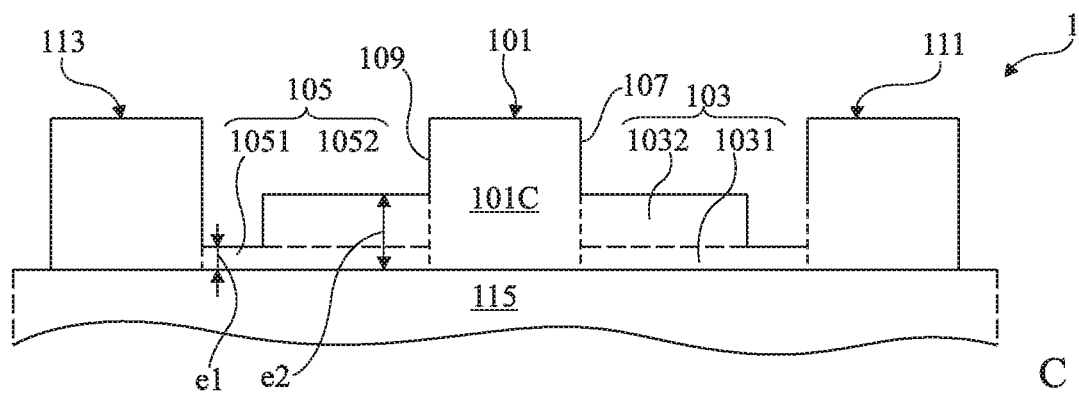

FIG. 1 is a partial simplified top view of an embodiment of a waveguide 1. FIG. 2 shows simplified cross-section views A, B, and C of the waveguide of FIG. 1, along respective planes AA, BB, and CC of FIG. 1.

Waveguide 1 comprises a band 101 and two lateral strips 103 and 105 on either side of band 101. Band 101 and strips 103 and 105 are preferably made of the same material, for example, silicon. Strips 103 and 105 are in contact with the respective lateral surfaces 107 and 109 of band 101. Band 101 and strips 103 and 105 have identical main (longitudinal) directions. Band 101 for example has a rectangular transverse cross-section having dimensions, that is, its width (between surfaces 107 and 109) and its thickness (between the upper and lower surfaces of the band), which are for example substantially constant, preferably constant. The thickness of strips 103 and 105, measured in the direction of the thickness of band 101, is smaller than the thickness of band 101.

Band 101 comprises an intermediate portion 101A corresponding to a portion of the length of band 101. In this embodiment, intermediate portion 101A is rectilinear (FIG. 1). Band 101 successively comprises, lengthwise (from left to right in FIG. 1), an upstream portion 101B, an optional upstream portion 101C, intermediate portion 101A, an optional downstream portion 101D, and a downstream portion 101E. Portions 101B, 101C, 101A, 101D, and 101E, delimited by vertical dotted lines in FIG. 1, are end-to-end. Intermediate portion 101A is thus interposed between the two optional upstream and downstream portions 101C and 101D, or between upstream and downstream portions 101B and 101E when the waveguide does not comprise optional upstream and downstream portions 101C and 101D.

Strips 103 and 105 are thinner (thickness e1, FIG. 2, view A) along intermediate portion 101A than (thickness e2, FIG. 2, view B) along upstream or downstream portions 101B and 101E. Thickness e2 is for example smaller than or equal to approximately half the thickness of band 101, for example approximately equal, preferably equal, to half this thickness. Thickness e1 is for example smaller than or equal to half thickness e2, for example, smaller than or equal to one third of thickness e2, preferably equal to one third of thickness e2.

Strips 103 and 105 are configured so that, along optional upstream and downstream portions 101C and 101D, the effective optical index of the guided optical mode propagating through waveguide 1 varies progressively from or all the way to intermediate portion 101A. The effective index of an optical mode is defined as being the ratio of the propagation constant of this mode to the wave vector in vacuum at the considered wavelength. Such a progressive variation of the effective index enables to limit or event to prevent spurious reflections of the guided optical mode during its propagation through successive portions 101B, 101C, 101A, 101D, and 101E. The progressive variation of the effective index is for example obtained due to progressive variations of the width of strips 103 and 105, along optional upstream and downstream portions 101C and 101D, across at least part of their thickness.

In this embodiment, each of strips 103 and 105 is formed, along optional upstream and downstream portions 101C and 101D (FIG. 2, view C), of a lower portion, respectively 1031 and 1051, and of an upper portion, respectively 1032 and 1052. Portions 1031 and 1051 have a thickness e1, the total thickness of an assembly of a lower portion and of an upper portion being equal to thickness e2. As illustrated in FIG. 1, the width of upper portions 1032 and 1052 progressively decreases towards intermediate portion 101A or progressively increases from portion 101A, whereby the effective index of the considered guided mode progressively varies.

Waveguide 1 further comprises two optional bands 111 and 113. Bands 111 and 113 are arranged along respective strips 103 and 105, at least along intermediate portion 101A. Bands 101, 111, and 113 have identical main (longitudinal) directions. Thus, band 111, respectively 113, and band 101 are arranged on either side of strip 103, respectively 105. Bands 111 and 113 are preferably in contact with respective strips 103 and 105. The thickness of bands 111 and 113 is for example substantially equal, preferably equal, to the thickness of band 101. Preferably, bands 111 and 113 are arranged to avoid disturbing the guided optical mode propagating through band 101, for example, by providing that, from upstream portion 101B to downstream portion 101E or from downstream portion 101E to upstream portion 101B, the decrease of the power of the guided optical mode is smaller than 0.001%. As an example, the minimum distance between band 101 and each band 111 and 113 is greater than or equal to 800 nm.

Bands 111 and 113 are, at least along intermediate portion 101A, totally or partly made of a material 117. Material 117 is selected to be absorbing at the wavelengths of the signal intended to be propagated in waveguide 1. As an example, for such wavelengths, the imaginary part of the refraction index of material 117 is in the range from 0.01 to 10. Material 117 is for examples selected from the group comprising silicide, germanium, silicon carbide, germanium-silicon, tin, titanium, titanium nitride, tantalum, tantalum nitride tungsten, copper, and alloys or mixtures of these materials.

According to one embodiment, bands 101, 111, and 113 and strips 103 and 105 are made of silicon, bands 111 and 113 being, at least along intermediate portion 101A, made of silicon, doped, for example, with boron, phosphorus, and/or arsenic atoms, to be more absorbing than intrinsic silicon in near infrared. According to another preferred embodiment where bands 111 and 113 are made of silicon, preferably doped, material 117 is silicide, obtained by metal deposition at the level of the upper surface of each band 111 and 113, which will interdiffuse in the silicon of bands 111 and 113, thus creating an absorbing material. Further, in these preferred embodiments, bands 111 and 113 are preferably in contact with the respective strips 103 and 105.

Waveguide 1 is embedded in a material, for example silicon oxide, having an optical index different from that of band 101. In the shown example, waveguide 1 rests on top of and in contact with a layer 115 (FIG. 2), for example, a silicon oxide layer. Preferably, layer 115 forms the insulating layer of a structure of semiconductor-on insulator (SOI) type, where waveguide 1 can then be defined in the semiconductor layer of the SOI structure, for example, during etch steps. A layer, not shown, preferably made of the same material as layer 115, covers waveguide 1.

A transverse electric optical mode is such that its electric field oscillates in a plane parallel to the upper surface of layer 115, and perpendicularly to the propagation direction of the signal in the waveguide. A transverse magnetic optical mode is such that its electric field oscillates in a plane perpendicular to the upper surface of layer 115, and perpendicularly to the propagation direction of the signal in the waveguide.

When an optical signal propagates through waveguide 1, for example, from upstream portion 101B to downstream portion 101E, the guided mode is confined in band 101 and spurious modes may be present and at least partly confined in the portions of strips 103 and 105 arranged along upstream portion 101B. Along intermediate portion 101A, due to the fact that strips 103 and 105 are thinner, spurious modes do not remains confined and radiate outside of the strips. This results in a filtering of the spurious modes. The spurious modes radiating outside of strips 103 and 105 are at least partly absorbed by material 117, which avoids for the radiated spurious modes to disturb possible photonic components arranged close to waveguide 1. As it comes out of intermediate portion 101A of band 101, the signal propagated in waveguide 1 no longer or almost no longer comprises spurious modes. As an example, the distance of bands 111 and 113 to respective strips 103 and 105 and/or the length of portion 101A are selected so that, from upstream portion 101B to downstream portion 101E or from downstream portion 101E to upstream portion 101B, the power of the spurious modes is decreased by more than 95%, preferably by more than 99%. Further, due to the fact that the guided mode remains confined in band 101 and is not coupled to bands 111 and 113, the latter is not disturbed during its propagation from upstream portion 101B to downstream portion 101E.

It could have been devised to suppress strips 103 and 105 or provided for them to have thickness e1 all along the length of waveguide 1 to avoid for spurious modes to propagate therein. However, this would result in increasing the transmission losses of the guided mode. Further, in the case of strips 103 and 105 having a non-zero thickness, when waveguide 1 is defined by etching in a semiconductor layer of an SOI structure, other photonic components may be defined in this same layer during the same etch steps. These other components, in particular coupling networks which may be provided at the ends of waveguide 1, may impose a depth for the etching of the semiconductor layer, and thus thickness e2.

It could have been devised to arrange material 117 closer to band 101, for example, by decreasing the width of strips 103 and 105, but this would result in a coupling of the guided optical mode with material 117, causing disturbances of the guided optical mode.

Figure 3:
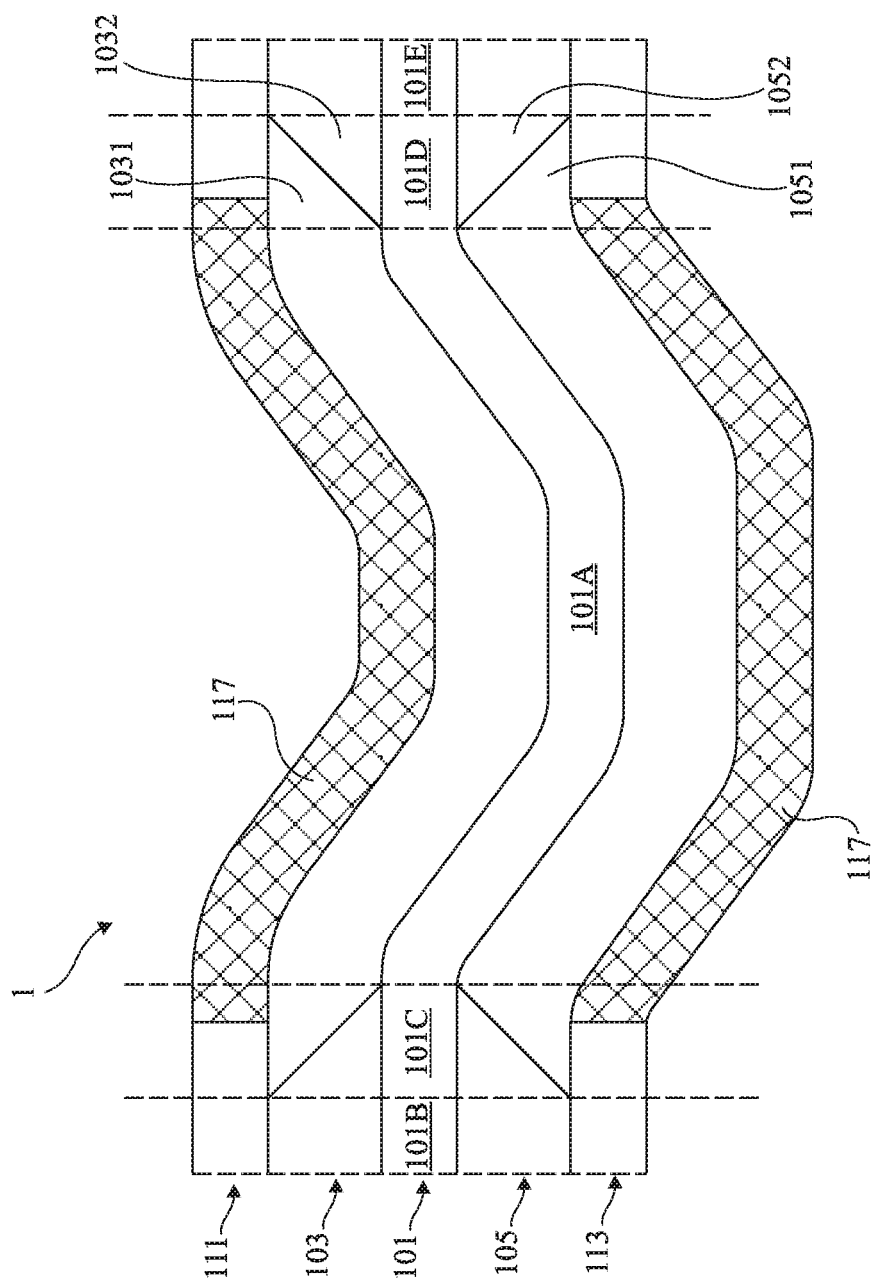
FIG. 3 is a partial simplified top view of an alternative embodiment of the waveguide of FIGS. 1 and 2.

FIG. 3 is a partial top view of an alternative embodiment of waveguide 1 of FIG. 1.

The waveguide 1 of FIG. 3 differs from that of FIGS. 1 and 2 in that intermediate portion 101A of band 101 is not rectilinear. In the embodiment of FIG. 3, intermediate portion 101A, is curved lengthwise.

As compared with the case where intermediate portion 101A is rectilinear, the provision of a intermediate portion 101A curved lengthwise enables to increase, along intermediate portion 101A, for spurious modes, the optical power radiated outside of strips 103 and 105.

In another alternative embodiment, not shown, strips 103 and 105 are interrupted along intermediate portion 101A of band 101. This amounts to considering that thickness e1 is zero. In this variation, the progressive variation of the effective optical index of the guided mode for example results from the fact that, along optional upstream and downstream portions 101C and 101D, the width of strips 103 and 105 decreases all the way to intermediate portion 101A.

As a specific embodiment, a waveguide 1 is provided with the following dimensions. The width of band 101 in the range from 200 to 420 nm, preferably equal to approximately 320 nm, for example, equal to 320 nm. The thickness of band 101 in the range from 220 to 500 nm, preferably equal to approximately 300 nm, for example equal to 300 nm. The width of strips 103 and 105 in the range from 800 to 1,790 nm, preferably equal to approximately 1,000 nm, for example, equal to 1,000 nm. The length of intermediate portion 101A in the range from 1 to 100 µm, preferably equal to approximately 60 µm, for example, equal to 60 µm. The length of each of the optional upstream and downstream portions 101C and 101D is in the range from 1 to 100 µm, preferably equal to approximately 20 µm, for example, equal to 20 µm.

Various embodiments and variations have been described. It will be understood by those skilled in the art that certain features of these various embodiments and variations may be combined, and other variations will occur to those skilled in the art. In particular, it may be provided for strips 103 and 105 to be interrupted along a non-rectilinear intermediate portion 101A.

Finally, the practical implementation of the described embodiments and variations is within the abilities of those skilled in the art based on the functional indications given hereabove. In particular, the dimensions and the materials indicated hereabove as an example, may be determined by those skilled in the art based on simulation tools, for example, simulation tools using finite difference time domain calculations (FDTD). An example of such a simulation tool is commercialized by company "Lumerical".

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:
1. A waveguide comprising:
   an upstream portion, a downstream portion, and an intermediate portion between the upstream portion and the downstream portion;
   a first band disposed on an insulating layer, the first band oriented along a first direction through the upstream, intermediate, and downstream portions, the first band comprising a first width along a second direction perpendicular to the first direction and a first thickness along a third direction perpendicular to the first and second directions, the first width of the first band in the upstream portion being equal to the first width of the first band in the intermediate portion;
   a first lateral strip disposed on a first side of the first band, the first lateral strip oriented along the first direction through the upstream, intermediate, and downstream portions, a thickness of the first lateral strip along the third direction in the upstream portion being greater than a thickness of the first lateral strip along the third direction in the intermediate portion; and a second lateral strip disposed on an opposite second side of the first band, the second lateral strip oriented along the first direction through the upstream, intermediate, and downstream portions, a thickness of the second lateral strip along the third direction in the upstream portion being greater than a thickness of the second lateral strip along the third direction in the intermediate portion, wherein both of the first lateral strip and the second lateral strip physically contact the first band.

2. The waveguide of claim 1, further comprising:
a second band disposed adjacent the first lateral strip, wherein the first lateral strip is disposed between the second band and the first band; and
a third band disposed adjacent the second lateral strip, wherein the second lateral strip is disposed between the third band and the first band.

3. The waveguide of claim 2, wherein the second band and the third band are parallel to the first band.

4. The waveguide of claim 2, wherein the second band and the third band, along the intermediate portion, comprise an absorbent material that is configured to absorb the wavelengths of a signal intended to be propagated through the waveguide.

5. The waveguide of claim 4, wherein the absorbent material is selected from the group comprising silicide, germanium, silicon carbide, germanium-silicon, tin, titanium, titanium nitride, tantalum, tantalum nitride, tungsten, copper, and alloys or mixtures of these materials.

6. The waveguide of claim 1, wherein, along the upstream portion and the downstream portion, the first lateral strip and the second lateral strip are configured so that the effective optical index of a guided optical mode intended to be propagated through the waveguide varies progressively all the way to the intermediate portion.

7. The waveguide of claim 1, wherein each of the first lateral strip and the second lateral strip is interrupted along the intermediate portion, and wherein a width of the first lateral strip and the second lateral strip decreases progressively all the way to the intermediate portion along each of the upstream portion and the downstream portion.

8. The waveguide of claim 1, wherein each of the first lateral strip and the second lateral strip is thinner along the intermediate portion and, along each of the upstream portion and the downstream portion, each of the first lateral strip and the second lateral strip comprises an upper portion having its width decreasing all the way to the intermediate portion.

9. The waveguide of claim 1, wherein the intermediate portion is curved lengthwise.

10. The waveguide of claim 1, wherein the first band, the first lateral strip, and the second lateral strip are part of a semiconductor layer of a semiconductor-on-insulator substrate, and wherein the insulating layer is the insulator of the semiconductor-on-insulator substrate.

11. An integrated photonic circuit comprising at least one waveguide of claim 1.

12. A method of filtering spurious modes of an optical signal, the method comprising:
propagating an optical signal propagating through a waveguide, the waveguide comprising:
an upstream portion, a downstream portion, and an intermediate portion between the upstream portion and the downstream portion,
a first band disposed on an insulating layer, the first band oriented along a first direction through the upstream, intermediate, and downstream portions, the first band comprising a first width along a second direction perpendicular to the first direction and a first thickness along a third direction perpendicular to the first and second directions, the first width of the first band in the upstream portion being equal to the first width of the first band in the intermediate portion,
a first lateral strip disposed on a first side of the first band, the first lateral strip oriented along the first direction through the upstream, intermediate, and downstream portions, a thickness of the first lateral strip along the third direction in the upstream portion being greater than a thickness of the first lateral strip along the third direction in the intermediate portion, and
a second lateral strip disposed on an opposite second side of the first band, the second lateral strip oriented along the first direction through the upstream, intermediate, and downstream portions, a thickness of the second lateral strip along the third direction in the upstream portion being greater than a thickness of the second lateral strip along the third direction in the intermediate portion, wherein both of the first lateral strip and the second lateral strip physically contact the first band.

13. The method of claim 12, wherein the waveguide further comprises:
a second band disposed adjacent the first lateral strip, wherein the first lateral strip is disposed between the second band and the first band; and
a third band disposed adjacent the second lateral strip, wherein the second lateral strip is disposed between the third band and the first band.

14. The method of claim 13, wherein the second band and the third band are parallel to the first band.

15. The method of claim 13, wherein the second band and the third band, along the intermediate portion, comprise an absorbent material that is configured to absorb the wavelengths of a signal intended to be propagated through the waveguide.

16. A waveguide comprising:
an upstream portion, a downstream portion, and an intermediate portion between the upstream portion and the downstream portion;
a first band disposed on an insulating layer, the first band oriented along a first direction through the upstream, intermediate, and downstream portions, the first band comprising a first width along a second direction perpendicular to the first direction and a first thickness along a third direction perpendicular to the first and second directions, the first width of the first band in the upstream portion being equal to the first width of the first band in the intermediate portion; and
a first lateral strip disposed on a first side of the first band, the first lateral strip oriented along the first direction, the first lateral strip comprising a first section in the upstream portion and a second section in the downstream portion, the first section being separated from the second section by a first gap in the intermediate portion so as to cause an interruption of the first lateral strip in the intermediate portion; and
a second lateral strip disposed on an opposite second side of the first band, the second lateral strip oriented along the first direction, the second lateral strip comprising a third section in the upstream portion and a fourth section in the downstream portion, the third section being separated from the fourth section by a second gap in the intermediate portion so as to cause an interruption of the second lateral strip in the intermediate portion, wherein both of the first lateral strip and the second lateral strip physically contact the first band.

17. The waveguide of claim 16, further comprising:
a second band disposed adjacent the first lateral strip, wherein the first lateral strip is disposed between the second band and the first band; and
a third band disposed adjacent the second lateral strip, wherein the second lateral strip is disposed between the third band and the first band.

18. The waveguide of claim 17, wherein the second band and the third band are parallel to the first band.

19. The waveguide of claim 17, wherein the second band and the third band, along the intermediate portion, comprise an absorbent material that is configured to absorb the wavelengths of a signal intended to be propagated through the waveguide.

20. The waveguide of claim 19, wherein the absorbent material is selected from the group comprising silicide, germanium, silicon carbide, germanium-silicon, tin, titanium, titanium nitride, tantalum, tantalum nitride, tungsten, copper, and alloys or mixtures of these materials.

21. The waveguide of claim 16, wherein, along the upstream portion and the downstream portion, the first lateral strip and the second lateral strip are configured so that the effective optical index of a guided optical mode intended to be propagated through the waveguide varies progressively all the way to the intermediate portion.

22. The waveguide of claim 16, wherein each of the first lateral strip and the second lateral strip is interrupted along the intermediate portion, and wherein a width of the first lateral strip and the second lateral strip decreases progressively all the way to the intermediate portion along each of the upstream portion and the downstream portion.

23. The waveguide of claim 16, wherein each of the first lateral strip and the second lateral strip is thinner along the intermediate portion and, along each of the upstream portion and the downstream portion, each of the first lateral strip and the second lateral strip comprises an upper portion having its width decreasing all the way to the intermediate portion.

24. The waveguide of claim 16, wherein the intermediate portion is curved lengthwise.

25. The waveguide of claim 16, wherein the first band, the first lateral strip, and the second lateral strip are part of a semiconductor layer of a semiconductor-on-insulator substrate, and wherein the insulating layer is the insulator of the semiconductor-on-insulator substrate.

26. An integrated photonic circuit comprising at least one waveguide of claim 16.

* * * * *